United States Patent
Vu et al.

(10) Patent No.: US 6,393,427 B1
(45) Date of Patent: May 21, 2002

(54) PERSONALIZED NAVIGATION TREES

(75) Inventors: Quoc Vu, San Jose; Wen-Syan Li, Fremont; Edward Chang, Santa Clara, all of CA (US)

(73) Assignee: NEC USA, Inc., Princeton, NJ (US)

( * ) Notice: Subject to any disclaimer, the term of this patent is extended or adjusted under 35 U.S.C. 154(b) by 0 days.

(21) Appl. No.: 09/274,814

(22) Filed: Mar. 22, 1999

(51) Int. Cl.$^7$ .............................................. G06F 17/30
(52) U.S. Cl. ....................... 707/101; 707/100; 707/102; 707/103; 707/104
(58) Field of Search ............................... 707/101, 3, 5, 707/6, 7, 10, 100, 102, 103; 706/45; 345/356, 357; 709/217, 218

(56) References Cited

U.S. PATENT DOCUMENTS

| | | | | |
|---|---|---|---|---|
| 5,430,869 A | * | 7/1995 | Ishak et al. | 707/101 |
| 5,870,735 A | * | 2/1999 | Agrawal et al. | 707/3 |
| 5,899,992 A | * | 5/1999 | Iyer et al. | 707/7 |
| 5,978,795 A | * | 11/1999 | Poutanen et al. | 707/3 |
| 6,061,675 A | * | 5/2000 | Wical | 706/45 |
| 6,144,991 A | * | 11/2000 | England | 709/205 |

OTHER PUBLICATIONS pharos.alexandria.ucb.edu/pharos–bin/LCC?LCC ID=(Root) 1997.
lcweb.loc.gov/catdir/cpso/lcco/lcco.html Aug. 31, 2000.
Foltz, Peter W., "Using Latent Semantic Indexing for Information Filtering," psych.nmsu.edu/~pfoltz/cois/filtering–cois.html 1990.
Li, Wen–Syan et al., "WebDB Hypermedia Database System," *IEICE Transactions on Information Systems*, 82(1), Jan. 1999.
Li, Wen–Syan et al., "PowerBookmarks: An Advanced Web Bookmark Database System and its Information Sharing and Management," In *Proceedings of 5$^{th}$ International Conference on Foundations of Data Organization (FODO '98)*, Kobe, Japan, Nov. 1998.
Deerwester, Scott et al, "Indexing by Latent Semantic Analysis," *Journal of the American Society for Information Science*, 41(6):391–407, Sep. 1990.
Honkela, Timo, "Self–Organizing Maps in Natural Language Processing," Thesis for the degree of Doctor of Philosophy, Helsinki University of Technology, Department of Computer Science and Engineering, Public defense at 12$^{th}$ of Dec., 1997.
Yahoo Communications Corporation. Information available at http: 2001.
Dolin, R., et al., "Using Automated Classification for Summarizing and Selecting Heterogeneous Information Sources," *D–Lib Magazine*, Jan. 1998.
Abrams, David, et al., "How People Use WWW Bookmarks," *ACM CHI 1997 Electronic Publications (Late–Breaking/Short Talks)*, 1997. Information available at http://.
Georgia Tech Research Corporation. GVU's 7$^{th}$ WWW User Survey, 1997. Information available at–1997–04/.

(List continued on next page.)

*Primary Examiner*—Frantz Coby
(74) *Attorney, Agent, or Firm*—Sughrue Mion, PLLC

(57) ABSTRACT

A method for constructing and maintaining a navigation tree based on external document classifiers is provided. In one embodiment, based on the returned category labels from the classifiers, a navigation tree is constructed by taking usability and user preferences into consideration. Control parameters and algorithms are provided for inserting into and deleting documents from the navigation tree, and for splitting and merging nodes of the navigation tree, are provided.

20 Claims, 10 Drawing Sheets

```
InsertDoc(Node N, Document D)
   if ( N.N is empty OR |D.C| = N.d ) then AddDoc(N, D)
   else
      j = N.d + 1
      find {N_j ∈ N.N|N_j.1 = D.C_j}
      if ( found such N_j ) then InsertDoc(N_j,D)
      else AddDoc(N, D)
AddDoc(Node N, Document D)
   N.L = N.L ∪ {D}
   if ( N.δ ≥ α + δ_split) then Split(N)
```

OTHER PUBLICATIONS

Miller, George A., et al., "Introduction to WordNet: An On–line Lexical Database," Aug. 1993, 9 pp.

Takano, Hajime, et al., "Dynamic Bookmarks for the WWW—Managing Personal Navigation Space by Analysis of Link Structure and User Behavior," *Proceedings of 1998 ACM Conference on Hypertext*, Jun. 1998.

Keller, Richard M., et al., "A Bookmarking Service for Organizing and Sharing URLs," *Proceedings of the 6$^{th}$ Intl. WWW Conference*, Apr. 1997.

Joachims, Thorsten, et al., "WebWatcher: A Tour Guide for the World Wide Web," *Proceedings of the 1997 Int'l Joint Conference on Artificial Intelligence*, Aug. 1997.

* cited by examiner

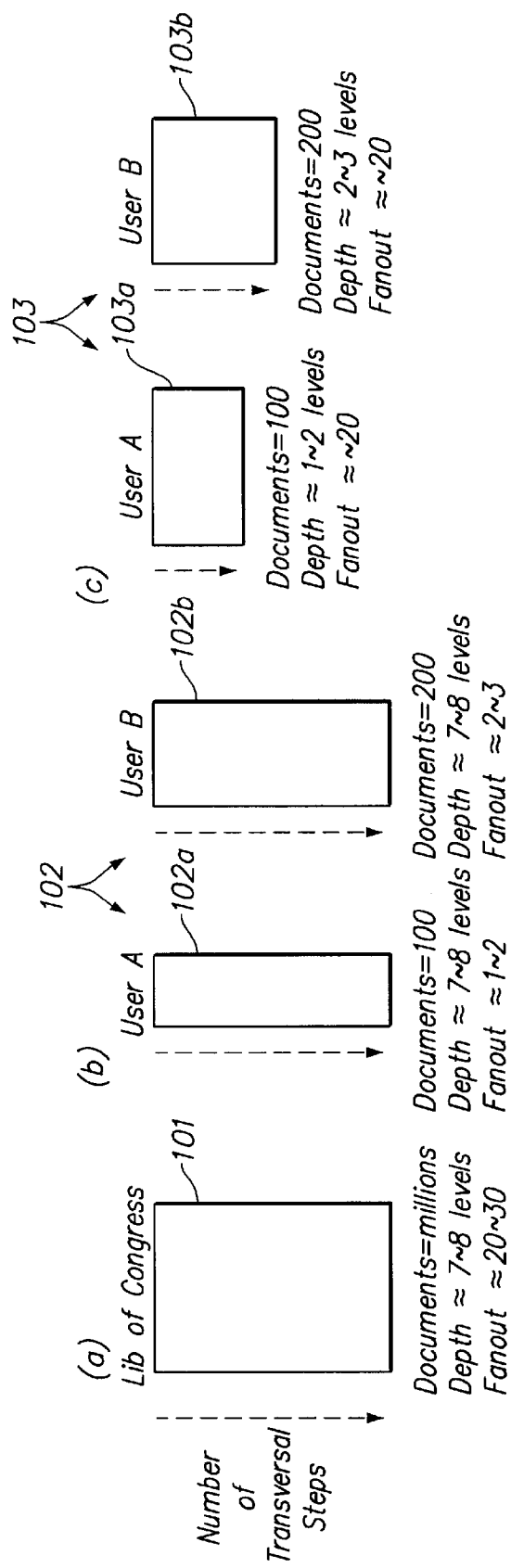

FIG. 1

Comparisons of Various Types of Classification Trees and Navigation Trees

Computers and Internet:Internet:World Wide Web:Databases and Searching: Web Directories
Computers and Internet:Software:Databases: Web Directories
Computers and Internet:Software:Reviews: Titles:Internet:Web Authoring Tools: Database Tools
Computers and Internet:Internet:World Wide Web:Databases and Searching
Regional:Countries:Canada:Computers and Internet:Internet:World Wide Web:Databases and Searching
Regional:Countries:New Zealand:Computers and Internet:Internet:World Wide Web:Databases and Searching
Regional:Countries:Australia:Computers and Internet:Internet:World Wide Web:Databases and Searching

FIG. 3

InsertDoc(Node $N$, Document $D$)
  if ( $N.N$ is empty OR $|D.C| = N.d$ ) then AddDoc($N$, $D$)
  else
    $j = N.d + 1$
    find $\{N_j \in N.N | N_j.1 = D.C_j\}$
    if ( found such $N_j$ ) then InsertDoc($N_j, D$)
    else AddDoc($N$, $D$)
AddDoc(Node $N$, Document $D$)
  $N.\mathcal{L} = N.\mathcal{L} \cup \{D\}$
  if ( $N.\delta \geq \alpha + \delta_{split}$ ) then Split($N$)

FIG. 5A

Split(Node $N$)
  $j = N.d + 1$
  $C\mathcal{L} = \{\forall \mathcal{L}_j \in N.\mathcal{L}, \text{ choose distinct } N.L_j.C_j\}$
  $Count_j = \{\text{ number of } D.L_k | D.L_k.C_j = CL_j\}$
  $\forall L_j \in C\mathcal{L}$, if $Count_j < \pi$ then $C\mathcal{L} = C\mathcal{L} \backslash L_j$
  choose $k$ labels $\{L_{a_1}, L_{a_2}, ..., L_{a_k}\} \in C\mathcal{L}$ such that
    1. $N.\delta + k - (Count_{a_1} + Count_{a_2} + ... + Count_{a_k}) \geq \alpha - \delta_{merge}$
    2. min $|N.\delta + k - (Count_{a_1} + Count_{a_2} + ... + Count_{a_k}) - \alpha|$
    3. min ($k$)
  if those 3 conditions are met then
    create subnodes $\{\forall i \in \{1,2,...,k\} N_{a_i} | N_{a_i}.1 = L_{a_i}\}$
    $\forall L_j \in N.\mathcal{L}$, move $N.\mathcal{L}_j$ to $N_{a_k}$ if $N.L_j.C_j = N_{a_k}.1$
    $N.N = N.N \cup \{N_{a_1}, N_{a_2}, ..., N_{a_k}\}$

FIG. 5B

| Document | Category |
|---|---|
| 1 | News: Full Coverage: Sport: Football |
| 2 | News: Full Coverage: Sport: Basketball:Michael Jordan |
| 3 | News: Full Coverage: Sport: Soccer: Worl Cup 98 |
| 4 | News: Full Coverage: Sport: Hockey |
| 5 | News: Full Coverage: Sport: Olympics |
| 6 | News: Full Coverage: Country: U.K. |
| 7 | News: Full Coverage: Country: France |
| 8 | News: Full Coverage: Country: Japan |
| 9 | News: Full Coverage: Entertainment: New Movies |
| 10 | News: Full Coverage: Entertainment: Music: Top 10 Hits |
| 11 | News: Full Coverage: Entertainment: Music Jazz |
| 12 | News: Full Coverage: Business: Stock Market |
| 13 | News: Full Coverage: Business: Companies |
| 14 | News: Full Coverage: Science: Biology |
| 15 | News: Full Coverage: Science: Electronic Commerce |
| 16 | News: Full Coverage: Country: Canada |

*FIG. 6A*

| #Documents | Category |
|---|---|
| 5 | News: Full Coverage: Sport: |
| 4 | News: Full Coverage: Country |
| 3 | News: Full Coverage: Entertainment |
| 2 | News: Full Coverage: Business |
| 2 | News: Full Coverage: Science |

*FIG. 6B*

DeleteDoc(Node $N$, Document $D$)
$N.\mathcal{L} = N.\mathcal{L} \setminus \{D\}$
if ($N.\mathcal{N} = \emptyset$ AND $|N.\mathcal{L}| < \pi$) then move $N.\mathcal{L}$ to its parent node, and remove this node
else if ($N.\delta \leq \alpha - \delta_{merge}$) then Merge($N$)

*FIG. 7A*

| Node: Full Coverage |
| --- |
| Country (subnode)<br>Entertainment (subnode)<br>U.S. (subnode)<br>News: Full Coverage: Sport: Football<br>News: Full Coverage: Sport: Basketball: Michael Jordan<br>News: Full Coverage: Sport: Soccer: World Cup 98<br>News: Full Coverage: Sport: Hockey<br>News: Full Coverage: Sport: Olympics<br>News: Full Coverage: Business: Stock Market<br>News: Full Coverage: Business: Companies<br>News: Full Coverage: Science: Biology<br>News: Full Coverage: Science: Electronic Commerce |
| Node: Full Coverage: Country |
| News: Full Coverage: Country: Canada<br>News: Full Coverage: Country: U.K.<br>News: Full Coverage: Country: France<br>News: Full Coverage: Country: Japan |
| Node: Full Coverage: Entertainment |
| News: Full Coverage: Entertainment: New Movies<br>News: Full Coverage: Entertainment: Music: Top 10 Hits<br>News: Full Coverage: Entertainment: Music: Jazz |

FIG. 6C

Merge(Node $N$)
   choose k subnodes $\{N.N_{\alpha_1}, N.N_{\alpha_2}, ..., N.N_{\alpha_k}\} \in N.N$ such that
     1. $N.\delta - k + |N.N_{\alpha_1}.\mathcal{L}| + |N.N_{\alpha_2}.\mathcal{L}| + ... + |N.N_{\alpha_k}.\mathcal{L}| \leq \alpha + \delta_{split}$
     2. min $|N.\delta - k + |N.N_{\alpha_1}.\mathcal{L}| + |N.N_{\alpha_2}.\mathcal{L}| + ... + |N.N_{\alpha_k}.\mathcal{L}| - \alpha|$
     3. max $(k)$
   if those 3 conditions are met then
     $\forall N.N_{\alpha_j} \in \{N.N_{\alpha_1}, N.N_{\alpha_2}, ..., N.N_{\alpha_k}\}$
     $N.\mathcal{L} = N.\mathcal{L} \cup \{N.N_{\alpha_j}.\mathcal{L}\}$
     $N.N_{\alpha_j}.\mathcal{L} = \emptyset$
     if ($N.N_{\alpha_j}$ is empty) then $N.N = N.N \setminus N.N_{\alpha_j}$
     else if ($N.N_{\alpha_j}.\delta \leq \alpha - \delta_{merge}$) then Merge($N.N_{\alpha_j}$)

FIG. 7B

| Node: Full Coverage |
|---|
| Business *(subnode)*<br>Country *(subnode)*<br>Entertainment *(subnode)*<br>U.S. *(subnode)*<br>News: Full Coverage: Sport: Basketball:Michael Jordan<br>News: Full Coverage: Sport: Soccer: World Cup 98<br>News: Full Coverage: Science: Biology |

| Node: Full Coverage: Business |
|---|
| News: Full Coverage: Business: Stock Market<br>News: Full Coverage: Business: Companies |

| Node: Full Coverage: Country |
|---|
| News: Full Coverage: Country: Canada<br>News: Full Coverage: Country: U.K.<br>News: Full Coverage: Country: France<br>News: Full Coverage: Country: Japan |

| Node: Full Coverage: Entertainment |
|---|
| News: Full Coverage: Entertainment: New Movies<br>News: Full Coverage: Entertainment: Music: Top 10 Hits<br>News: Full Coverage: Entertainment: Music Jazz |

| Node: Full Coverage: U.S. |
|---|
| News: Full Coverage: U.S.: Senate<br>News: Full Coverage: U.S.: Elections |

*FIG. 8A*

| Node: Full Coverage |
|---|
| Entertainment *(subnode)*<br>News: Full Coverage: Sport: Basketball:Michael Jordan<br>News: Full Coverage: Sport: Soccer: World Cup 98<br>News: Full Coverage: Science: Biology<br>News: Full Coverage: Business: Stock Market<br>News: Full Coverage: Business: Companies<br>News: Full Coverage: Country: Canada<br>News: Full Coverage: Country: U.K.<br>News: Full Coverage: Country: France<br>News: Full Coverage: Country: Japan<br>News: Full Coverage: U.S.: Senate<br>News: Full Coverage: U.S.: Elections |

| Node: Full Coverage: Entertainment |
|---|
| News: Full Coverage: Entertainment: New Movies<br>News: Full Coverage: Entertainment: Music: Top 10 Hits<br>News: Full Coverage: Entertainment: Music: Jazz |

*FIG. 8B*

FIG. 9
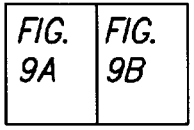
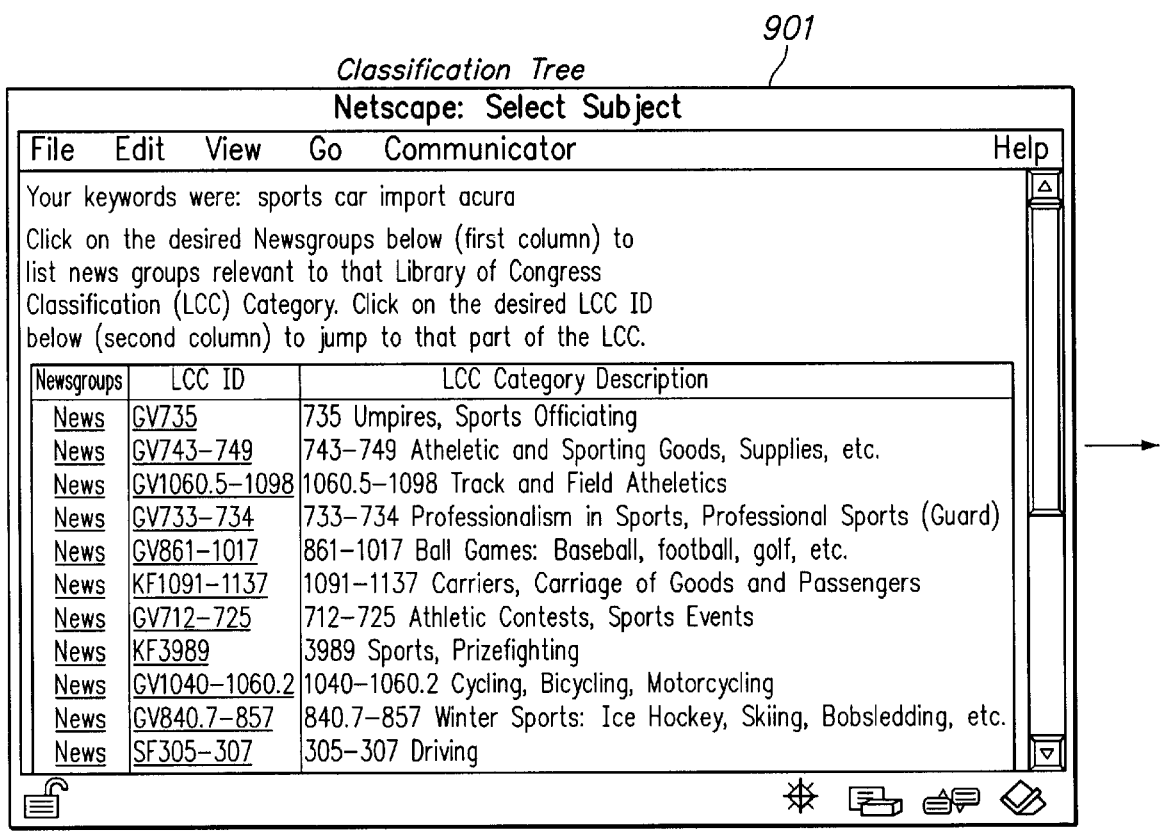
FIG. 9A

PERSONALIZED NAVIGATION TREES

CROSS REFERENCE TO RELATED APPLICATION

The present application is a related to copending U.S. patent application ("the '759 Patent Application"), entitled "Advanced Web Bookmark Database System," Ser. No. 09/184,759, filed on Nov. 2, 1998, and assigned to NEC USA, Inc., which is also the Assignee of the present invention. The disclosure of the '759 Patent Application is hereby incorporated by reference in its entirety.

The present Application is also related to U.S. patent application (the "PowerBookmark Application"), entitled "System for Personalizing, Organizing and Managing Web Information," Ser. No. 09/273,808, filed on Mar. 22, 1999 now pending the same day as the present Application, and assigned to the Assignee of the present invention. The disclosure of the PowerBookmark Application is hereby incorporated by reference in its entirety.

BACKGROUND OF THE INVENTION

1. Field of the Invention

The present invention relates to organizing documents retrieved from the world wide web (WWW) or intranets. In particular, the present invention relates to organizing such documents under a classification scheme for efficient access.

2. Discussion of the Related Art

Two approaches to document organization are clustering (i.e., non-supervised learning) and classification (i.e., supervised learning). The major difference between clustering and classification is that clustering does not rely on a training set but classification does.

In one clustering technique, documents are dynamically clustered based on similarity. However, such an approach suffers from several shortcomings. First, the classification accuracy depends heavily on the number of documents in the database. Second, choosing good labels for categories generated based on clustering is difficult since the labels selected may not be meaningful to the users. To choose good labels for generated categories, many techniques based on word frequency analysis have been proposed. In general, however, these techniques have not been found effective. Consequently, for navigation purpose, clustering techniques are inferior to manual classification and labeling.

Classification is a method for both organizing documents in a document database and facilitating navigation of such a document database. Existing classifiers, such as Library of Congress Classification (LCC), can be used to organize local collections of documents. However, LCC's classification and category labels are usually too fine (e.g. six to seven levels) for organizing relatively smaller local collections of documents.

For client side document categorization, such as organizing bookmarks and electronic mail ("emails") for individual users, the clustering approach is mainly chosen because a large document set is not available at the client side to train the classifier. On the other hand, at the server side, since abundant training data are available, the classification approach is often chosen.

Using the clustering approach to organize client documents (e.g., bookmarks and emails) suffers from many shortcomings resulting from the small document set at the client side. A small document set can generate clusters of no statistical significance and thus, when a small number of documents is added, which is proportionally large to the document set, the clusters can be easily changed.

SUMMARY OF THE INVENTION

The present invention provides a method for providing, on the client side, a navigation tree using an external classifier. The method comprises a maintenance method including a method for merging a parent internal node and leaf nodes, and a method for splitting an internal node in a parent internal node. In one embodiment, each leaf node represents a document in the navigation tree and each internal node is associated with a label representing a category of classification of the child internal nodes and leaf nodes associated with the parent internal node.

According to one aspect of the invention, a document insertion method is provided which inserts a document into the navigation tree according to a classification obtained from an external classifier using keywords in the document. The method also provides a document deletion method for deleting a document from the navigation tree. The method for splitting an internal node of a parent internal node is invoked by the document insertion method when a predetermined criterion is met. Similarly, the method for merging a parent internal node is invoked by the document deletion method when another predetermined criterion is met.

In one embodiment, the document insertion method and the document deletion method each include a step tending to maintain a preferred breadth of an internal node of the navigation tree to a predetermined value $\alpha$, being a desired number of child internal nodes and leaf nodes of a parent internal node.

The method of splitting an internal node of a parent internal node assigns leaf nodes to a new internal node, such that the total number of internal nodes and leaf nodes of the parent node is kept at a minimum after splitting. The predetermined criterion is met in the method for splitting a parent internal node when the total number of leaf nodes and internal nodes associated with the parent internal node is greater than the sum of a predetermined value $\alpha$ and a predetermined value $\delta_{split}$. The method selects a minimum number of internal nodes for splitting, subject to a constraint ("constrained minimum"). In one embodiment, the constraint minimum applies when multiple internal nodes can be selected for splitting to result in the same net change in the total number of leaf nodes and internal nodes.

The method of merging a parent internal node assigns leaf nodes of an internal node to the parent internal node, such that the total number of internal nodes and leaf nodes of the parent node after merging is minimized. The predetermined criterion is met in the method of merging a parent internal node when the total number of leaf nodes and internal nodes associated with the parent internal node is less than the difference of a predetermined value $\alpha$ and a predetermined value $\delta_{merge}$. The method of merging a parent internal node selects a constrained maximum number of leaf nodes for merging. In one embodiment, the constraint minimum applies when multiple internal nodes can be selected for splitting to result in the same net change in the total number of leaf nodes and internal nodes.

In one embodiment, the predetermined value $\alpha$, the predetermined value $\delta_{split}$ and the predetermined value $\delta_{merge}$ are each user independently selectable.

In one embodiment, the method of the present invention assigns a document (i.e., a leaf node) to internal nodes according to an access frequency of the document. The internal node selected for each document is intended to minimize the number of steps necessary to reach a frequently accessed document.

The present invention is better understood upon consideration of the detailed description below and the accompanying drawings.

BRIEF DESCRIPTION OF THE DRAWINGS

FIGS. 1(a)–1(c) show three document sets 101, 102 and 103 of different sizes.

FIG. 3 shows the classifications of keywords "Web" and "Database" returned from an inquiry to an internet search engine;

FIG. 5(a) provides the pseudocode for inserting document D into node N of a navigation tree.

FIG. 5(b) provides the pseudocode for splitting a node N.

FIG. 6(a) shows a table listing the documents of a node N before a split operation.

FIG. 6(b) shows a table listing the categories of node N of FIG. 6(a) before a split operation.

FIG. 6(c) shows the documents and groups of node N of FIG. 6(a) after a split operation and the documents of new subnodes created by the split.

FIGS. 7(a) and 7(b) show respectively the pseudocode for deleting a document D from a node N, and the pseudocode for merging the subnodes of node N into the node N.

FIG. 8(a) shows the documents and groups of a node N after a file is deleted.

FIG. 8(b) shows the documents and groups of node N of FIG. 8(a) after a merge operation has taken place.

DETAILED DESCRIPTION OF THE EMBODIMENTS

Figure 2:
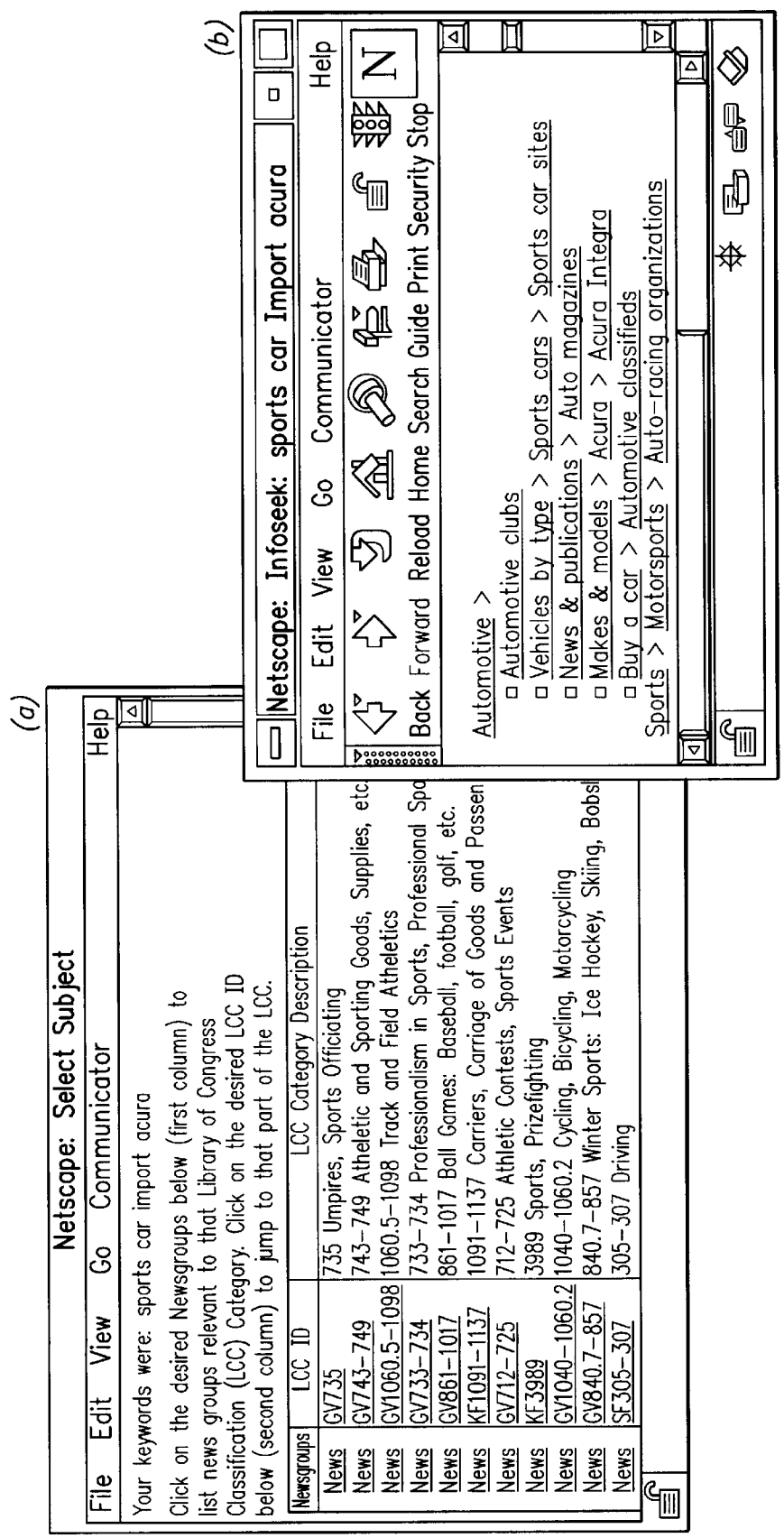
FIG. 2(a) shows the classifications of a number of keywords under the Library of Congress (LCC) classification scheme.
FIG. 2(b) shows the classifications of the same keywords of FIG. 2(a) returned from an internet search engine.

Classification information can be obtained from content providers (e.g., a library or a Web search engine), which have large document sets and computing resources to run sophisticated classifiers. Today, some servers classify each document into categories that are returned with the document. Many servers, although not providing categories explicitly, allow a user to extract keywords from the document to query the server for possible categories. For instance, with the keyword "XML", a classifier returns the category label "Computers and Internet/Information and Documentation/Data Formats/XML".

Without modification, the returned category labels cannot be used to organize documents. For example, FIGS. 1(a)–1(c) show two document sets 101, and 102 of different sizes. Document set 101 of FIG. 1(a) includes millions of documents. As a result, a classification tree with very fine categories (e.g., with a tree depth of 7 or 8) may be required. In contrast, Document set 102 of FIG. 1(b) is relatively small—including document subset 102a (for User A) and document subset 102b (for Library B), having only a few hundred documents and a few thousand documents, respectively. Thus, providing document subset 102a and document subset 102b the same fine classification tree categories as document set 101 results in deep but sparse trees which require many traversal steps to reach a document. Such deep tree structures yield poor performance and lower usability.

Depth and breadth tradeoff is known from graphical user interface menu design. A "rule of thumb" fixes the short-term memory span of a human being to hold between 5 to 9 items (the so-called "magic number"). A recent study on depth and breadth tradeoff shows that, while increased depth did harm search performance, and moderate depth and breadth outperformed the broadest, shallow structure overall. Thus, document subsets 102a and 102b should be organized in FIG. 1(c) by classification trees 103a and 103b of moderate depths and breadths for efficient navigation. Ideally, the breadth of each node in the tree should be close to the magic number or other breadth of the users' preferences. At the same time, the tree structure should be kept as shallow as possible consistent with classification accuracy. Tree structures 103a and 103b of FIG. 1(c) are referred to as navigational classification trees, or simply "navigation trees" to distinguish from classification trees of FIGS. 1(a) and 1(b).

Figure 9B:
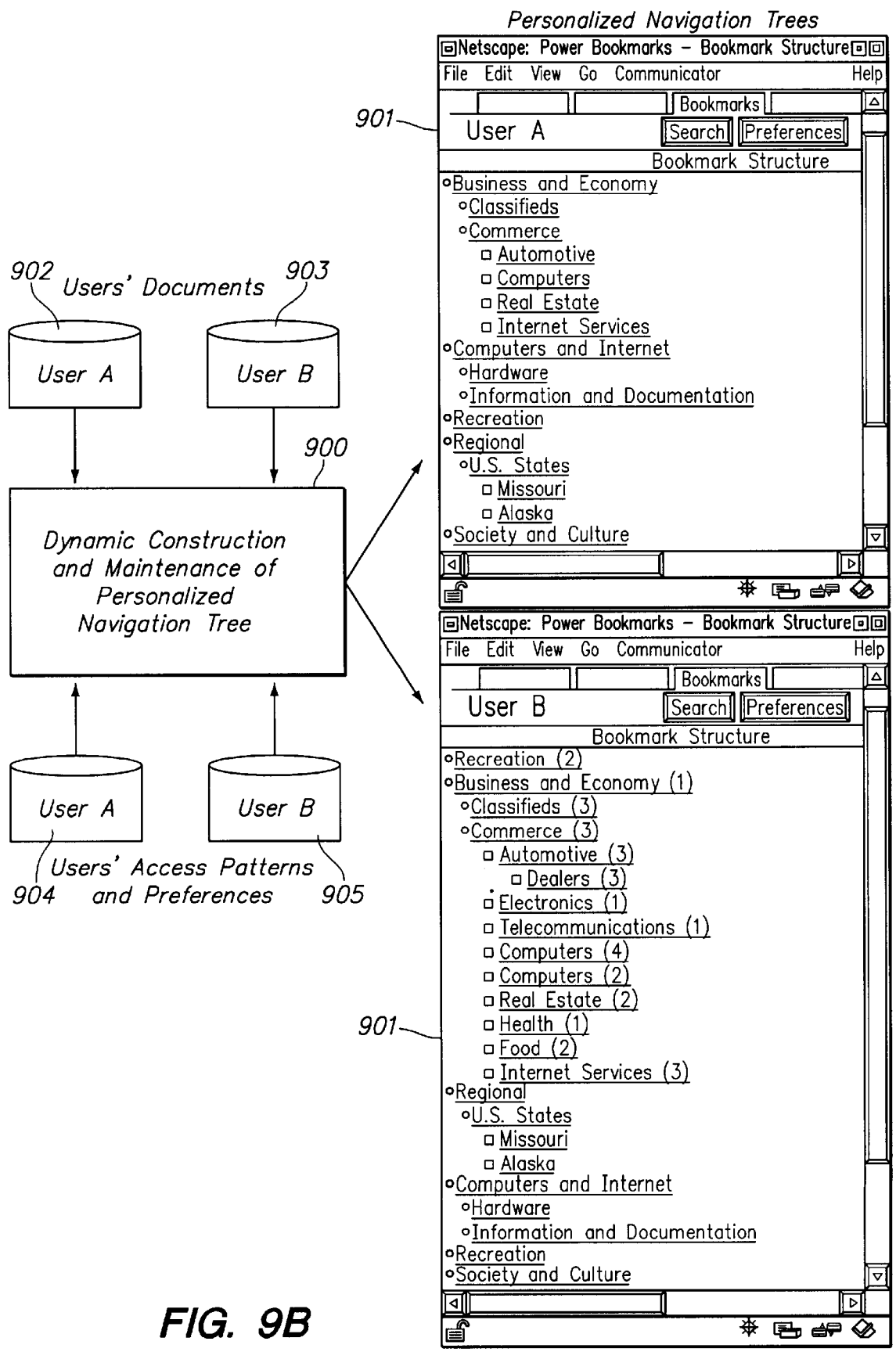
FIG. 9 is a schematic representation of one embodiment of the present invention.

The present invention provides a method for constructing, on the client side, a navigation tree based on existing classifiers (e.g., Library of Congress Classification (LCC)) which have deep classification trees for indexing a large amounts of documents. One embodiment of the present invention is shown schematically as system 900 in FIG. 9. In system 900, before introducing a document into a navigation tree, an external classifier is queried using information contained in the document. In response, the external classifier returns a classification tree 901. From classification tree 901 returned from the classifier, the method of the present invention constructs a navigation tree adaptively to the size of the user's document collection on the client side. Further, a user can specify a breadth preference, such as 10, according to the magic number rule of thumb. Other examples of preferences that can be used to customize construction of the navigation tree include access frequency, multiple classifications, and user-provided classifications, which are discussed in further detail below. As shown in FIG. 9, system 900 is a multi-user system providing for each user (e.g. user "A" and user "B") personalized navigation trees 906 and 907, according to each user's access pattern and preferences (represented by data sets 904 and 905, for users A and B respectively), and the characteristics of the user's document collection (represented by data sets 902 and 903). The methods of system 900 is provided in further detail below.

The method of the present invention can split and merge nodes as required to maintain both preferable breadth and classification correctness. Thus, a method of the present invention adaptively maintains a navigation tree structure more preferable to effective document retrieval and higher usability of a document database. One method of the present invention is implemented in a bookmark management system described in the copending Bookmark Application incorporated by reference above. Thus, a detailed description of the bookmark management system is not repeated.

A number of classifiers are available on-line to use and many of them are well-built based on millions of documents. Most of such classifications are done manually by domain experts, so that the accuracy of classifications is typically high. FIG. 2(a) shows a classification based on LCC for a document with the keywords "sports", "car", "import", and "acura". Each LCC ID represents a node in the Library of Congress classification hierarchical structure. The tag of a node is a label in a path from the top level root node to the node into which the document is classified. Some existing search engines also provide classification functionalities, such as the example shown in FIG. 2(b).

According to the present invention, when a document is introduced, the classification categories of the document are identified in the following two steps:

1. Extracting significant keywords from documents: for example, nouns with high occurrence frequency are significant keywords. In this step, techniques, such as morphing and stop word filtering, are applied.
2. Querying the classifier: for example, using the keywords extracted from the document, a classifier is queried as to the categories the document belongs. The classifier may return multiple classification categories because the meaning of a document could be ambiguous.

To illustrate this approach, suppose a document has significant keywords "Web" and "Database", which are then used to query a classifier. The classifier returns a number of categories each represented as a path. These categories are shown in FIG. 3.

To organize documents for ease of navigation and quick document lookup, the management of a category tree must satisfy the following three requirements: document density, structural stability and adaptability. To achieve high document density, documents should fill the topmost nodes as much as possible (up to the magic number or user's preferred breadth) to facilitate quick access to a larger number of documents. Structural stability is necessary to avoid frequent confusing navigation tree reorganizations that confuse the user. When the navigation tree has to be reorganized for usability reasons, the changes are made in a least disruptive manner. Adaptability of the navigation tree is necessary to accommodate the user's usability preferences. For instance, for the user who prefers specificity to generality, a deeper tree may be more desirable. For the user who prefers high usability, keeping those frequently accessed documents in a shallower node has been shown more effective.

Figure 4:
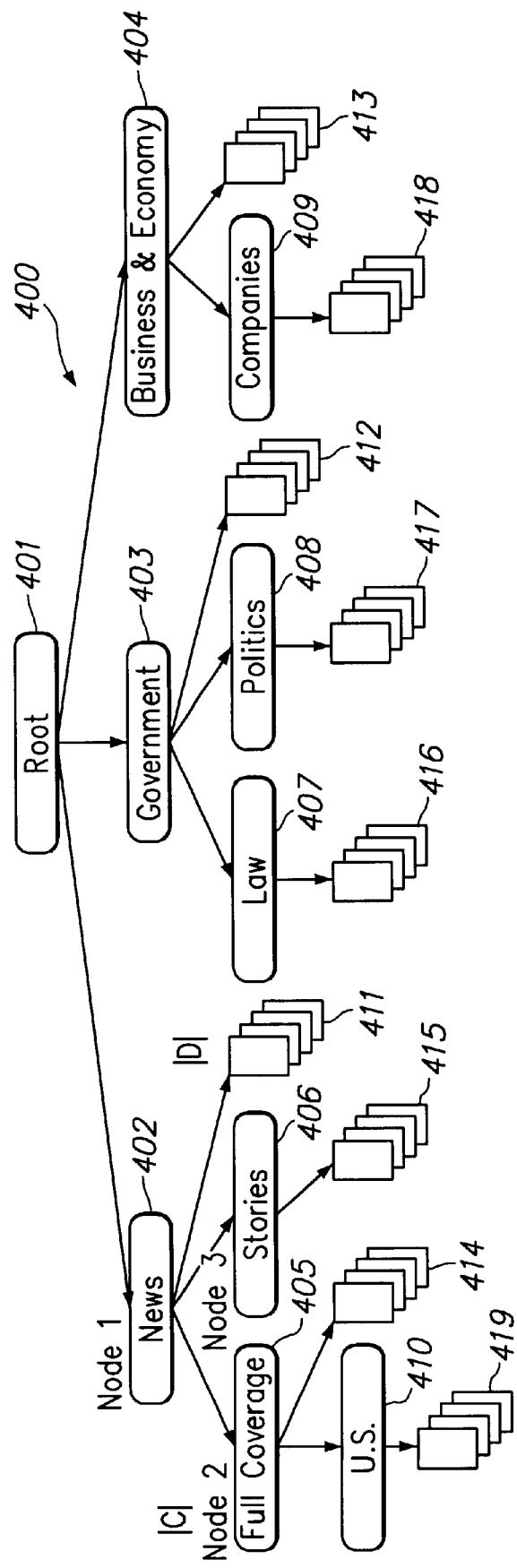
FIG. 4 shows an example navigation tree 400.

A navigation tree contains internal vertices, representing categories, and external vertices, representing documents. For convenience, we refer to an internal vertex as a "node" and an external vertex as a "leaf". To facilitate description, the following naming convention is adopted:

"T" denotes a navigation tree and also its root node;
"N" denotes an internal node;
"L" denotes a leaf node;
"|S|" denotes the number of elements in set S;
"N.N" denotes the set of internal child nodes of N;
"N.N" denotes the set of internal nodes of N;
"N.N$_i$" denotes an internal child node i of node N;
"N.N$_i$" denotes the ith child internal node of node N;
"N.L" denotes the set of child leaf nodes of node N;
"N.L$_i$" denotes the ith child leaf node of node N;
"N.d" denotes the depth of node N;
"N.δ" denotes the breadth of node N (N.δ=|N.N|+|N.L|);
"N.l" denotes a label of the node N;
"L.C" denotes the category of leaf node L;
"L.C$_i$" denotes the ith label of category of the leaf node L;
"γ(D.C)" denotes the function returning the number of levels of document D's category label;
"π" denotes the minimum number of leaves per node;
"α" denotes the preferable breadth in a node;
"$\delta^{split}$" denotes the threshold beyond á for splitting a node;
"$\delta_{merge}$" denotes the threshold below á for merging nodes;

To identify a node uniquely, labels from the root node T to node N are concatenated. Each node thus has a unique name, since each tree path is unique. FIG. 4 shows an example navigation tree 400. Labeled rectangles 401–410 (e.g.,"News" and "Government") are categories and shaded boxes 411–419 are documents. For example, following a category label "News/Full Coverage", the "Full Coverage" sub-category 405 is located under the "News" category 402. Node 402 has the label "News", a depth of one, and a breadth is 6, since it contains two sub-categories "Full Coverage" (node 405) and "Stories" (node 406) and four documents. Documents in node 405 are categorized as "News: Full Coverage". The second label of such category is "Full Coverage".

The control parameters "α", "$\delta_{split}$", and "$\delta_{merge}$" are provided for achieving structural stability and adaptability. In the following example, to simplify discussion, each document is assumed to belong to one and only one category initially. The extension to multiple category classification is discussed below after the following example.

When a user inserts a document, the classification category of the document is obtained from a classifier. Then, the document is inserted into navigation tree 400 in two steps. First, the category label of the document is followed to place the document in the deepest possible existing node in the current tree where the label of such a node matches the category of the document. Then, the node where the document is inserted is split, if a split condition is met. The pseudocode for inserting document D into node N is provided in FIG. 5(a). The pseudocode for splitting node N is provided in FIG. 5(b)

In the pseudocode of the FIG. 5(a), a recursive procedure InsertDoc inserts document D into node N. From the specified node N, the navigation tree is recursively traversed along the path with labels matching the labels of document D, until all labels of document D are matched or a leaf node is encountered. For example, when a user inserts a document belonging to the "News/Full Coverage/US/Intern" category into navigation tree 400, the path "News" (402), "Full Coverage" (405) and "U.S." (410), is traversed and the document is inserted under "U.S." (node 410). Since the "Intern" category does not exist under "US" (node 410), the deepest node for the document is node 410 "News/Full Coverage/U.S.".

Next, the node into which the document is inserted is checked if a split should occur. If the number of children of the node exceeds the preferable breadth α by more than $\delta_{split}$, the node is a candidate for splitting. Thus, the split condition is N.δ≧α+$\delta_{split}$. When the split condition is met, corresponding subnodes are created, and the documents that belong to the subnodes are moved from node N to the subnodes. To determine how many and which subnodes to create, the three factors of the structural stability requirement are considered:

(a) document density—the number of child nodes of node N should be close to α;
(b) minimizing future splits and merges—again, the breadth of node N should be kept as close to α as possible after the split;
and (c) minimizing structural changes—creating a minimum number of subnodes.

When a node is split, its breadth is reduced to a value as close to α as possible. However, the split operation creates ΔN new sub-nodes so that ΔL documents (a negative number) of N can be moved into the new sub-nodes. Thus the change in the breadth of node N is (ΔN+ΔL). More than one set of (ΔN, ΔL) may satisfy the split constraints.

To minimize the structural changes, the present invention selects (ΔN+ΔL) is minimum. If multiple ΔNs and ΔLs exist such that each (ΔN+ΔL) is minimum, the present invention selects the set of (ΔN, ΔL) with the smallest ΔN. This heuristic allows more documents, rather than categories, close to the root node T. This choice provides the advantage of finding a target document earlier, since the average depth of a leaf node is minimized.

To illustrate how insert and split operations proceed, suppose a document D with the category "News/Full Coverage/Country/Canada" is inserted into navigation tree 400. Document D is initially inserted into node 405 ("News/Full Coverage") node. FIG. 6(*a*) shows Table 1 which lists the 16 documents stored under the "News/Full Coverage" node 405 before document D is inserted. Suppose a is 12 and $\delta_{split}$ is 5. Since the total number of child nodes has equaled $a\alpha+\delta_{split}=17$, node 405 (i.e., "News:Full Coverage") may be split. The goal is to create as few subnodes as possible to move down some documents from "Full Coverage". FIG. 6(*b*) shows a table listing five candidate subnodes of node 405 and the number of documents belonging to each subnode. The groups ("Country", "Entertainment") and ("Country", "Business", "Science") are the best options for splitting, scoring respectively 17+2−(4+3)=12 and 17+3−(4+2+2)=12. Since the goal also is to minimize structural change, the group ("Country", "Entertainment") is selected. Accordingly, subnodes for the "News:Full Coverage:Country" and "News:Full Coverage:Entertainment" categories are formed, and documents (6, 7, 8, 16) and (9, 10, 11) are moved into the "Country" and the "Entertainment" subnodes, respectively. FIG. 6(*c*) shows a table listing the documents in the Node "News:Full Coverage" and new subnodes "Country" and "Entertainment".

When a document is deleted from a node, the breadth of this node decreases. Under the present invention, when the breadth (N.δ) of a node N drops below the merge threshold $\delta_{merge}$, node N becomes a candidate for a merge operation. When the merge conditions are met, the documents in some subnodes are moved into the parent node. The same factors of structural stability discussed above with respect to splitting a node also determine how many and which subnodes to collapse. Node merge is substantially the reverse operation of node splitting discussed above. When a document is deleted from node N, if the new degree N.δ of node N is less than $(\alpha-\delta_{merge})$, the merge operation is triggered. When subnodes are merged, the breadth of the parent node is increased to a value as close to the preferred breadth α as possible. The merge operation removes ΔN (a negative number) sub-nodes and the ΔL documents contained in removed sub-nodes are moved into the parent node. As in the split condition discussed above, multiple solutions of (ΔN, ΔL) can exist. To preserve structural stability, the solution which minimizes (ΔN+ΔL) is selected. If multiple sets of (ΔN, ΔL) result in the same value for (ΔN+ΔL), the (ΔN, ΔL) set with the largest ΔL is selected. Using this heuristic approach, more documents, rather than categories, are made closer to the root node (e.g., node 401 of FIG. 4). In other words, the average depth of a leaf node in the navigation tree is minimized. Thus, target documents are reached within a smaller expected number of traversal steps of the navigation tree.

FIGS. 7(*a*) and 7(*b*) show respectively the pseudocode for deleting a document D from a node N, and the pseudocode for merging the subnodes of node N into the node N, if the conditions described above are satisfied. To illustrate how delete and merge operations proceed, suppose a document D in the category "Full Coverage" (node 405) is deleted from navigation tree 400. FIG. 8(*a*) is a table listing the documents and subnodes of node N after the deletion. Suppose that α is 12 and $\delta_{merge}$ is 5. Since the merge condition $N.\delta<=\alpha-\delta_{merge}=7$ is met, node 405 (i.e., "News:Full Coverage") may be merged with one or more of its child subnodes. The goal is for the merged node 405 to have documents and child nodes to number as close to α as possible. The groups ("Country", "Entertainment") and ("Country", "Business", "U.S.") are candidates for merging, scoring respectively 7+4+3=14 and 7+4+2+2=15. Since the goal also is also to minimize as many categories as possible, the group ("Country", "Business", "U.S.") is selected. FIG. 8(*b*) shows a table listing the documents in node "Full Coverage" after subnodes "Country" "Business" and "U.S." are merged into node "Full coverage".

The present invention is adaptive to various usability preferences:

(a) General versus specific: some users prefer to keep all files in one directory, while others may prefer to organize files into a deep hierarchical tree. Thus, user preferences are accommodated by allowing a user to change the value of α. A larger α value results in a shallower navigation tree having more general categories. Conversely, a smaller α value provides a deeper tree with more specific classification categories.

(b) Frequency of navigation tree reorganization: the values of $\delta_{split}$ and $\delta_{merge}$ can be varied by the user to achieve the desired frequency of navigation tree reorganization if $\delta_{split}$ is set to very large (e.g., infinity), the resulting navigation tree does not split. One the other hand, setting $\delta_{merge}$ to very large disables the merge operation. (Infrequent merge operations enhances structural stability)

(c) Manual categorization: a user manually assigns categories to selected documents that are different from categories assigned by the classifier. For example, a "Starr Report" may be categorized by a classifier into the category "Government: US Government: Politics". In the present embodiment, the user can reclassify the "Starr Report" to a "News Event" folder, and override any automatically assigned category.

(d) Access Frequency: in one embodiment, a document's frequency of access affects its classification. For example, the number of traversal steps to reach a document can be used to determine whether or not a document is to be moved to sub-categories. In one scheme, a less frequently accessed document should be provided a longer tree path over a more frequently accessed document. Similarly, in determining which document to merge into super-categories, more frequently accessed documents are given preference over less frequently accessed documents.

(e) Multiple categories: a document may be classified by the content providers into multiple categories. For instance, in response to a keyword query using the term "NEC", a commercial search engine returns twelve possible categories to which the related documents may belong. Classifying a document into too many categories conflicts with the purpose of classification. Thus, the embodiment described above allows documents in multiple categories to be "logically" eliminated into fewer categories or a unique category. The logical elimination is carried out in the course of the insertion/split and deletion/merge operations described above.

The pseudocodes for splitting and merging nodes provided in FIGS. 5(*b*), and 7(*b*) aim at two goals:

(1) Incremental reorganization of navigation trees, with minimum changes at each split; and (2) minimizing the depth of navigation trees, while maintaining the preferred breadth of each internal node.

Instead of maintaining the breadth of a node as close to α as possible, the following split policies can be implemented:

(a) Greedy Split: move all (or as many as possible) documents down to the sub-categories to minimize the number-of future splits. (One drawback of this approach is the relatively large effect of a split, so that the user experiences a sudden change in his/her navigation tree).

(b) Maximum Split: Another incremental splitting approach creates a sub-node that has a maximum number of child nodes, rather than maintaining a value close to alpha.

An experiment was conducted to construct classification or navigation trees using the greedy split heuristics and the maximum split heuristics using randomly selected five sets of documents from the Web. The five sets have 100, 200, 300, 400, and 500 documents respectively. Regardless of the splitting scheme used, the approach of the present invention produces shallower trees than the classification trees. In this experiment, a navigation tree under the present invention has an average depth between 2 and 3, as compared with depth of 5 using the classification tree. Also, the approach of the present invention produces a more compact tree in terms of both the depth and the breadth. In this experiment, the number of total nodes in the navigation tree is roughly 75% less than the classification tree. This result is reasonable because the approach of the present invention merges many nodes to the higher level to produce a tree with preferable breadth. The approach of the present invention also produces a more dense tree with fewer internal nodes for the same number of documents in the navigation tree. Thus, the approach of the present invention maintains an actual breadth (i.e., density) close to the desired navigation tree breadth, thereby assuring better performance in navigation.

The experiment also shows the split heuristics in the pseudocodes of FIG. 5(b) outperforms the "maximum split" and "greedy split" heuristics, since the heuristics in the pseudocodes of FIG. 5(b) yields the most shallow and dense tree, while maintaining the breadth close to the magical number. Also, the navigation tree resulting from the pseudocodes of FIG. 5(b) is more stable since split operations occur less frequently.

Finally, the deletion operation was tested by interlacing insertions and deletions. In that experiment, 1000 insertions and N deletions were performed, and the results were compared to inserting 1000−N documents into the same initial navigation tree. After these insertions and deletions, the two sets of documents are the same. The experiment showed two similar navigation tree structures having substantially the same average depth of documents and total number of nodes maintained. Hence, the structure of navigation trees maintained by the pseudocodes of FIG. 5(a) are stable and are independent from the order of document insertions and deletions.

Figure 10:
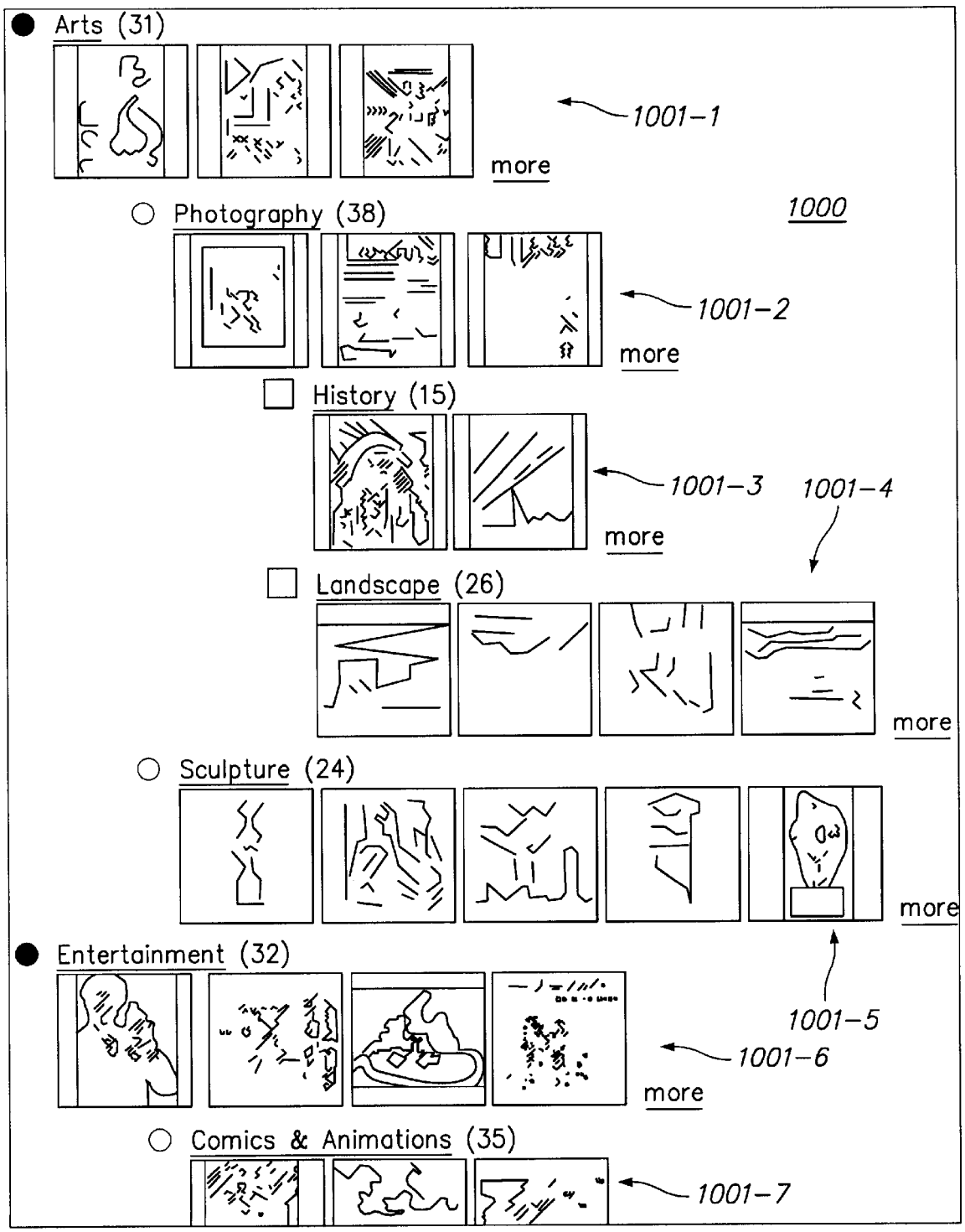
FIG. 10 shows a screen image of a navigation tree 100 in an exemplary image libary.

The present invention, in addition to being applied in the manner described in the PowerBookmark Application incorporated by reference above, is also applied to an image classification scheme for navigation of a digital image library. In this second application, keywords extracted from the proximity of images in HTML documents are used to query a classifier for their possible categories. Based on the category information returned from the classifier, the images are organized into a tree structure. Image clustering is then performed by visual characteristic, such as color and shape. After clustering, for each cluster, the system selects the image closest to the cluster center as a representative image. The system then displays only the representative images of the more "significant" clusters for each category. In one exemplary implementation, the system displays the representative images for the K largest clusters, such that the number of images in these K clusters exceeds 70% of the total number of images in the category. FIG. 10 shows a screen image of a navigation tree 100 in an exemplary image libary. As shown in FIG. 10, representative images 1001-a . . . 1001-n are provided for significant clusters of each category in the navigation tree.

The above detailed description is provided to illustrate the specific embodiments of the present invention and is not intended to be limiting. Numerous modifications and variations within the scope of the present invention are possible. The present invention is set forth in the following claims.

We claim:

1. A method for providing a navigation tree, comprising:
providing a maintenance method including a method for merging a parent internal node and leaf nodes, and a method for splitting a parent internal node, wherein each leaf node representing a document in said navigation tree and each internal node being associated with a label representing a category of classification of internal nodes and leaf nodes associated with said internal node, and where said method of merging and said method of splitting include comparison to user determined parameters;

providing a document insertion method, wherein said insertion method inserts a document into said navigation tree according to a classification obtained from an external classifier using keywords in said document; and providing a document deletion method for deleting a document from said navigation tree;

wherein said document insertion and said document deletion methods each includes a step tending to maintain a breadth of an internal node of said navigation tree to a predetermined value α.

2. A method as in claim 1, wherein said method for splitting a parent internal node is invoked by said document insertion method when a predetermined criterion is met.

3. A method as in claim 2, wherein said method of splitting a parent internal node assigns leaf nodes to a new internal node, such that the total number of internal nodes and leaf nodes of said parent node is a minimum.

4. A method as in claim 2, wherein said criterion is met when the total number of leaf nodes and internal nodes associated with said parent internal node is greater the sum of the predetermined value α, being a value representing a desired number of documents associated with said internal node, and a predetermined value $\delta_{split}$.

5. A method as in claim 4, wherein said predetermined value $\delta_{split}$ is user selectable.

6. A method of claim 2, wherein said method selects a constrained minimum number of internal nodes for splitting.

7. A method as in claim 1, wherein said method for merging a parent internal node is invoked by said document deletion method when a predetermined criterion is met.

8. A method as in claim 7, wherein said method of merging a parent internal node assigns leaf nodes to an internal node to said parent internal node, such that the total number of internal nodes and leaf nodes of said parent node is minimized.

9. A method as in claim 7, wherein said criterion is met when the total number of leaf nodes and internal nodes associated with said parent internal node is less than the difference of the predetermined value $\alpha$, being a value representing a desired number of documents associated with said internal node, and a predetermined value $\delta_{merge}$.

10. A method as in claim 9, wherein said predetermined value $\delta_{merge}$ is user selectable.

11. A method as in claim 7, wherein said method of merging a parent internal node selects a constrained maximum number of leaf nodes for merging.

12. A method as in claim 1, wherein said predetermined value $\alpha$ is user selectable.

13. A method as in claim 1, wherein each leaf node being associated an internal node according to an access frequency of the document associated with said internal node.

14. A method as in claim 1, wherein said method for splitting a node implements a greedy split policy.

15. A method as in claim 1, wherein said method for splitting a node implements a maximum split policy.

16. A method as in claim 1, wherein said document insertion method allows a user-specified classification to override said classification obtained from said external classifier.

17. A method as in claim 1, wherein said document insertion method further takes into account an access frequency of said document.

18. A method as in claim 1, wherein said document insertion method retrieves multiple classifications of said document from said external classifier, said document insertion method eliminating one or more of said multiple classifications according to a predetermine criterion.

19. A method as in claim 1, wherein said navigation tree is created in a bookmark management system.

20. A method as in claim 1, wherein said navigation tree is provided in a digital image library.

* * * * *

UNITED STATES PATENT AND TRADEMARK OFFICE
CERTIFICATE OF CORRECTION

PATENT NO. : 6,393,427 B1
DATED : May 21, 2002
INVENTOR(S) : Quoc Vu, Wen-Syan Li and Edward Chang It is certified that error appears in the above-identified patent and that said Letters Patent is hereby corrected as shown below:

Column 1,
Line 5, delete "a";

Column 5,
Line 65, delete " "$\delta^{split}$" " and insert -- "$\delta_{split}$" --;

Column 7,
Line 15, delete "a" and insert -- $\alpha$ --;
Line 17, delete "a".

Signed and Sealed this

Twenty-ninth Day of October, 2002

*Attest:*

JAMES E. ROGAN
*Attesting Officer*    *Director of the United States Patent and Trademark Office*